United States Patent
Mauney

(10) Patent No.: US 11,951,342 B2
(45) Date of Patent: Apr. 9, 2024

(54) NOZZLE AND VALVE ASSEMBLY FOR A FIRE EXTINGUISHER

(71) Applicant: Carrier Corporation, Palm Beach Gardens, FL (US)

(72) Inventor: Ronald Coble Mauney, Snow Camp, NC (US)

(73) Assignee: Carrier Corporation, Palm Beach Gardens, FL (US)

( * ) Notice: Subject to any disclaimer, the term of this patent is extended or adjusted under 35 U.S.C. 154(b) by 664 days.

(21) Appl. No.: 16/811,027

(22) Filed: Mar. 6, 2020

(65) Prior Publication Data
US 2020/0306573 A1    Oct. 1, 2020

Related U.S. Application Data

(60) Provisional application No. 62/826,663, filed on Mar. 29, 2019.

(51) Int. Cl.
| | |
|---|---|
| A62C 31/02 | (2006.01) |
| A62C 13/64 | (2006.01) |
| A62C 13/68 | (2006.01) |
| A62C 13/76 | (2006.01) |
| F16L 15/06 | (2006.01) |

(52) U.S. Cl.
CPC .............. *A62C 31/02* (2013.01); *A62C 13/64* (2013.01); *A62C 13/68* (2013.01); *A62C 13/76* (2013.01); *F16L 15/06* (2013.01)

(58) Field of Classification Search
CPC ......... A62C 13/62; A62C 13/64; A62C 13/68; A62C 13/76; A62C 31/02; F16L 15/06; F16L 47/16
See application file for complete search history.

(56) References Cited

U.S. PATENT DOCUMENTS

| | | | |
|---|---|---|---|
| 2,375,615 A | 5/1942 | Boal | |
| 2,506,074 A | 5/1950 | Fawkes | |
| 2,681,707 A | 6/1954 | Mapes | |
| 2,851,985 A | 9/1958 | Keehn | |
| 3,139,934 A | 7/1964 | Gorski | |

(Continued)

FOREIGN PATENT DOCUMENTS

| | | |
|---|---|---|
| CN | 1072606 | 6/1993 |
| CN | 2834623 | 11/2006 |

(Continued)

OTHER PUBLICATIONS

Extended European Search Report for EP Application No. 20166011.5 dated Aug. 4, 2020.

(Continued)

*Primary Examiner* — Christopher R Dandridge
(74) *Attorney, Agent, or Firm* — Carlson, Gaskey & Olds, P.C.

(57) ABSTRACT

A valve body and nozzle assembly for a fire extinguisher includes a valve body that includes a nozzle connection that has a valve body threaded portion. A non-metallic nozzle includes a proximal end that has a valve body connection with a nozzle threaded portion in engagement with the valve body threaded portion. The nozzle threaded portion includes a root portion that has at least one radius of curvature extending between adjacent rows of a thread of the nozzle threaded portion.

22 Claims, 3 Drawing Sheets

(56) References Cited

U.S. PATENT DOCUMENTS

| | | | |
|---|---|---|---|
| 3,901,322 A | 8/1975 | Winston | |
| 3,998,274 A | 12/1976 | Liautaud | |
| 4,119,153 A * | 10/1978 | Avant | A62C 13/76 |
| | | | 169/89 |
| 4,862,968 A | 9/1989 | Woodman | |
| 6,068,058 A * | 5/2000 | Ellis, Jr. | A62C 13/62 |
| | | | 169/74 |
| 6,186,558 B1 | 2/2001 | Komolrochanaporn | |
| 6,742,599 B1 | 6/2004 | Nam | |
| 7,387,140 B2 | 6/2008 | Brunn | |
| 7,527,302 B2 | 5/2009 | Lewis et al. | |
| 7,841,420 B2 | 11/2010 | Sitabkhan | |
| 7,967,035 B2 | 6/2011 | Brunn | |
| 7,988,204 B2 | 8/2011 | Lewis et al. | |
| 8,172,275 B2 | 5/2012 | Sumrall, Jr. et al. | |
| 8,500,175 B2 | 8/2013 | Jung | |
| 8,893,815 B2 | 11/2014 | Mauney | |
| 9,140,395 B2 | 9/2015 | Jung | |
| 9,709,202 B2 | 7/2017 | Spears | |
| 2005/0211448 A1 | 9/2005 | Neumeir et al. | |
| 2006/0175067 A1 * | 8/2006 | Cover | A62C 13/76 |
| | | | 169/30 |
| 2006/0185859 A1 * | 8/2006 | Lin | A62C 31/05 |
| | | | 169/30 |
| 2008/0245282 A1 * | 10/2008 | Richards | A62C 5/02 |
| | | | 239/424.5 |
| 2013/0186655 A1 * | 7/2013 | Mauney | A62C 3/006 |
| | | | 169/74 |
| 2018/0106399 A1 * | 4/2018 | Freed | F16L 15/06 |

FOREIGN PATENT DOCUMENTS

| | | |
|---|---|---|
| DE | 202005010596 | 9/2005 |
| DE | 102006039403 | 3/2008 |
| GB | 1151856 | 5/1969 |
| GB | 1568467 | 5/1980 |
| KR | 101594072 | 2/2016 |
| WO | 2013010098 | 1/2013 |
| WO | 2016154696 | 10/2016 |

OTHER PUBLICATIONS

Knuckle thread Wikipedia—Retrieved from the Internet: URL:https://en.wikipedia.org/w/index.php?titlr=Knuckle thread&oldid=751399454 [retrieved on Jul. 14, 2020] *the whole document*.

* cited by examiner

NOZZLE AND VALVE ASSEMBLY FOR A FIRE EXTINGUISHER

CROSS-REFERENCE TO RELATED APPLICATIONS

This application claims priority to U.S. Provisional Application No. 62/826,663, which was filed on Mar. 29, 2019 and is incorporated herein by reference.

BACKGROUND

This disclosure relates generally to fire extinguishers and, more particularly, to a handheld fire extinguishers with separate discharge nozzles for dispensing a fire extinguishing agent from a portable vessel.

Historically, handheld fire extinguishers for fighting fires have been used in a number of household and commercial situations for extinguishing fires that originated from varying sources, such as chemicals or liquids. In order to ensure proper functionality of the fire extinguisher over a wide range of temperatures, the fire extinguishers must withstand impacts over a wide range of temperatures without sustaining damage that could compromise the performance of the fire extinguisher. In particular, during very low temperature testing, such as at negative 40 degrees Fahrenheit, it is possible that the nozzle can become brittle when made of a polymeric material resulting in a greater likelihood of performance compromising damage to the fire extinguisher. Therefore, there is a need to design a nozzle for a fire extinguisher which can withstand impacts over a wide range of temperatures without compromising performance and reliability of the fire extinguisher.

SUMMARY

In one exemplary embodiment, a valve body and nozzle assembly for a fire extinguisher includes a valve body that includes a nozzle connection that has a valve body threaded portion. A non-metallic nozzle includes a proximal end that has a valve body connection with a nozzle threaded portion in engagement with the valve body threaded portion. The nozzle threaded portion includes a root portion that has at least one radius of curvature extending between adjacent rows of a thread of the nozzle threaded portion.

In a further embodiment of any of the above, at least one radius of curvature includes a first radius at an intersection of a proximally facing threaded surface and the root portion. A second radius is at an intersection of a distally facing threaded surface and the root portion.

In a further embodiment of any of the above, the root portion includes a flat portion between the first radius and the second radius.

In a further embodiment of any of the above, a valve body sleeve portion separates the valve body threaded portion from an outlet of the nozzle connection. The outlet of the nozzle connection is at least partially defined by a lip.

In a further embodiment of any of the above, the valve body sleeve portion includes an axial length greater than an axial length of one rotation of a thread on the valve body threaded portion.

In a further embodiment of any of the above, the valve body connection includes a nozzle sleeve portion distal of the nozzle threaded portion. The nozzle sleeve portion is located adjacent a step in the nozzle.

In a further embodiment of any of the above, the nozzle sleeve portion includes at least one projection extending radially outward from the nozzle sleeve portion.

In a further embodiment of any of the above, the valve body sleeve directly contacts the nozzle sleeve portion to form an interference fit.

In a further embodiment of any of the above, the nozzle includes an internal fluid passage in fluid communication with an internal fluid passage the valve body.

In a further embodiment of any of the above, the valve body is metallic and the nozzle is made of a nylon material.

In another exemplary embodiment, a valve body and nozzle assembly for a fire extinguisher includes a valve body including a nozzle connection that has a valve body threaded portion and a valve body sleeve portion. A non-metallic nozzle includes a proximal end that has a valve body connection with a nozzle threaded portion in engagement with the valve body threaded portion. A nozzle sleeve portion is in engagement with the valve body sleeve portion.

In a further embodiment of any of the above, the valve body sleeve portion circumscribes the nozzle connection. The valve body sleeve portion is located adjacent a step in the nozzle.

In a further embodiment of any of the above, the valve body sleeve portion separates the valve body threaded portion from an outlet of the nozzle connection. The outlet of the nozzle connection is at least partially defined by a lip.

In a further embodiment of any of the above, the valve body sleeve portion includes an axial length greater than an axial length of one rotation of threads on the valve body threaded portion.

In a further embodiment of any of the above, valve body sleeve portion includes a constant outer diameter and the nozzle sleeve portion includes a constant outer diameter.

In a further embodiment of any of the above, the nozzle sleeve portion includes at least one projection that extends radially outward from the nozzle sleeve portion.

In a further embodiment of any of the above, the valve body sleeve directly contacts the nozzle sleeve portion to form an interference fit.

In a further embodiment of any of the above, at least one radius of curvature includes a first radius at an intersection of a proximally facing threaded surface and the root portion. A second radius is at an intersection of a distally facing threaded surface and the root portion.

In a further embodiment of any of the above, the root portion includes a flat portion between the first radius and the second radius.

In a further embodiment of any of the above, the valve body is metallic and the nozzle is made of a nylon material.

DETAILED DESCRIPTION

Figure 1:
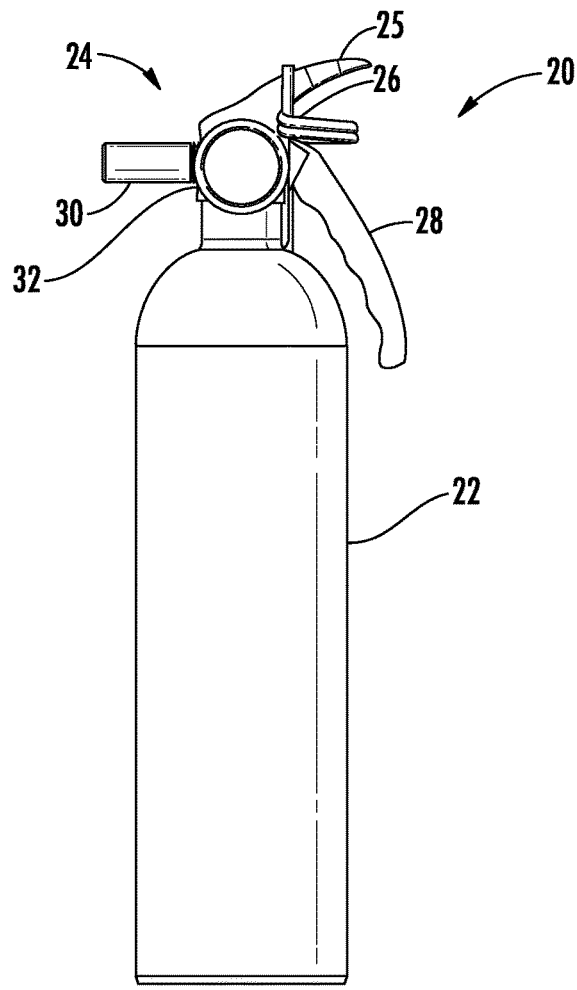
FIG. 1 is an example portable fire extinguisher.

FIG. 1 illustrates an example portable handheld fire extinguisher 20 including a vessel 22 containing a chemical suppressing medium, such as a dry chemical fire extinguishing agent, and a discharge assembly 24 capping an outlet throat of the vessel 22. The discharge assembly 24 includes a valve body 32 having a trigger mechanism 25 that actuates the fire extinguisher 20 and a safety lock pin 26 that prevents unintended actuation of the trigger mechanism 25. The discharge assembly 24 also includes a handle 28 for holding the fire extinguisher 20 by a user and a discharge nozzle 30 for directing the contents of the vessel 22 in a desired direction.

Figure 2:
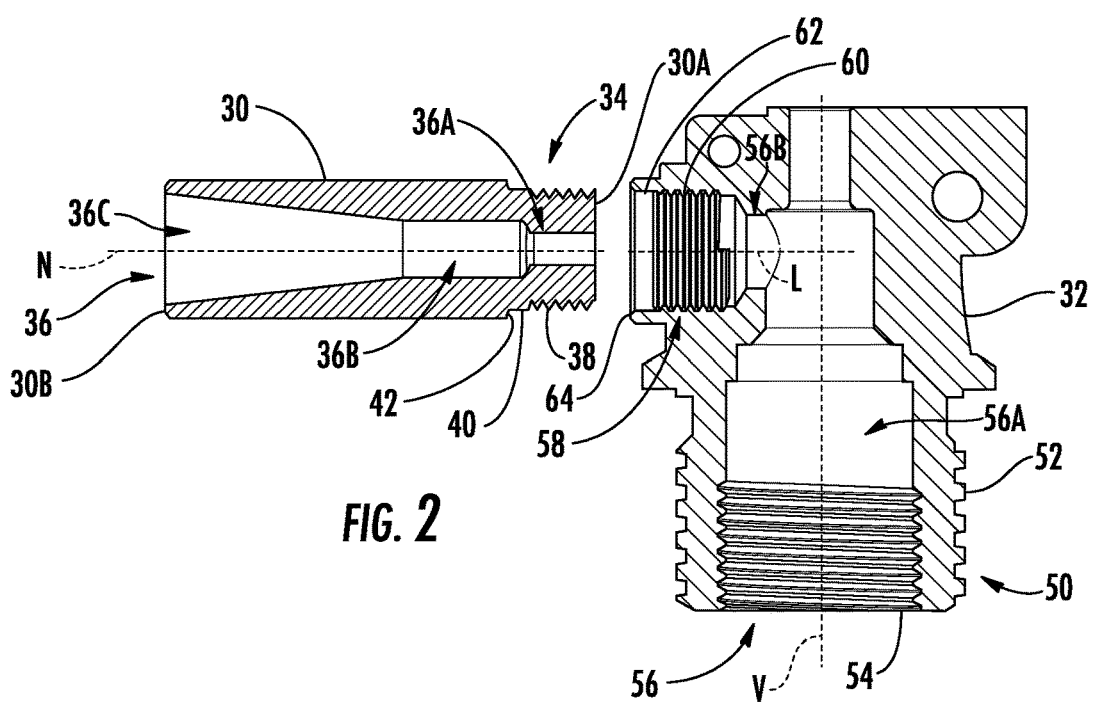
FIG. 2 illustrates a sectional view of a discharge nozzle and a valve body.

FIG. 2 is a sectional view of the discharge nozzle 30 and valve body 32 prior to assembly. In the illustrated non-limiting example, the discharge nozzle 30 includes a valve body connection 34 for engaging a nozzle connection 58 on the valve body 32. The discharge nozzle 30 is made of a non-metallic material, such a polymeric or a composite material and the valve body 32 is made of a metallic material. One example non-metallic material for the discharge nozzle would be a high strength nylon, such as Zytel® ST 801.

The valve body connection 34 is located at a proximal end 30A of the discharge nozzle 30 and an internal passage 36 extends through the discharge nozzle 30. In the illustrated example, the internal passage 36 includes an inlet portion 36A adjacent the proximal end 30A, a mid-portion 36B, and an expanding portion 36C expanding in cross sectional area from the mid-portion 36B to a distal end 30B of the discharge nozzle 30.

The valve body connection 34 also includes a threaded portion 38 adjacent the proximal end 30A and a nozzle sleeve portion 40 adjacent a distal end of the threaded portion 38. In the illustrated example, the nozzle sleeve portion 40 includes a surface having a constant outer diameter. A step 42 is located adjacent an opposite edge of the nozzle sleeve portion 40 from the threaded portion 38 and transitions the nozzle sleeve portion 40 to an outer surface of the discharge nozzle 30. In the illustrated example, the valve body connection 34 extends axially along a central longitudinal axis N of the discharge nozzle 30 from the proximal end 30A to a location axially aligned with the mid-portion 36B.

As shown in FIG. 2, the valve body 32 includes a vessel connection portion 50 having a ribbed or threaded exterior surface 52 and a threaded interior surface 54. The threaded exterior surface 52 and the threaded interior surface 54 extend longitudinally along an axis V. At least one of the threaded exterior surface 52 and the threaded interior surface 54 on the valve body 32 engage the vessel 22 to secure the discharge assembly 24 to the outlet throat of the vessel 22. The valve body 32 also includes a first internal passage 56A that extends along the axis V and a second internal passage 56B that extends along an axis L. In the illustrated example, the axis V is perpendicular to the axis L. The first and second internal passages 56A, 56B communicate the fire extinguishing medium from the vessel 22 through the valve body 32 and into the discharge nozzle 30.

The nozzle connection 58 on the valve body 32 is located in the second internal passage 56B and includes a threaded portion 60 and a valve body sleeve portion 62. As shown in the illustrated example, the threaded portion 60 and the valve body sleeve portion 62 on the nozzle connection 58 face radially inward relative to the axis L of the second internal passage 56B. The valve body sleeve portion 62 includes an axial length relative to the axis L that is greater than an axial length of one rotation of threads on the threaded portion 60 of the nozzle connection 58.

Figure 3:
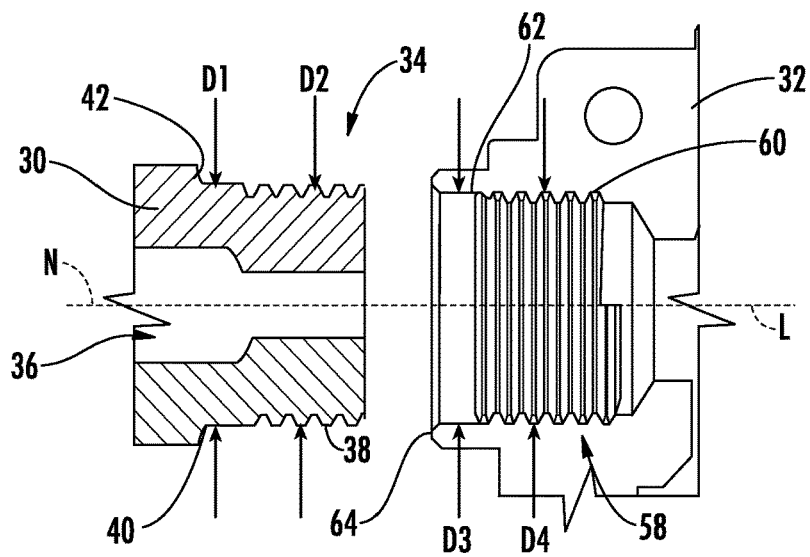
FIG. 3 is an enlarged view of a valve body connection and a nozzle connection.
Figure 4:
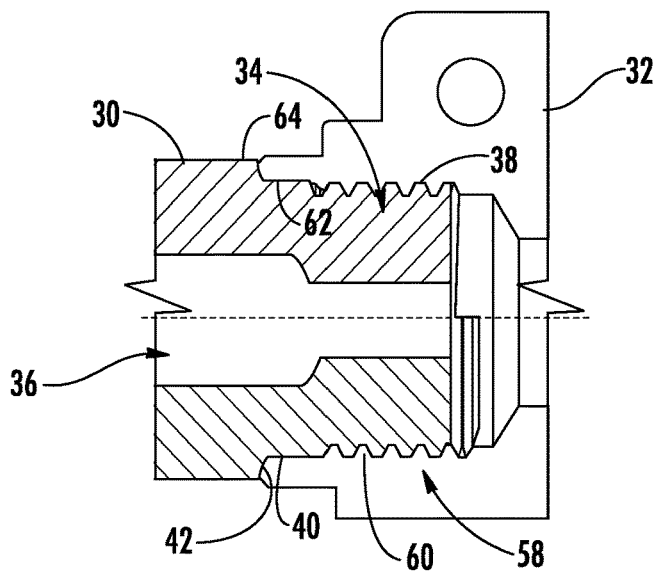
FIG. 4 illustrates the discharge nozzle secured to the valve body.

As shown in FIGS. 3 and 4, the threaded portion 38 and nozzle sleeve portion 40 on the discharge nozzle 30, respectively, engage the threaded portion 60 and the valve body sleeve portion 62 on the valve body 32. A radially outer dimension of the nozzle sleeve portion 40 on the valve body connection 34 defines a diameter D1 and radially outer dimension of the threaded portion 38 on the valve body connection 34 defines a diameter D2. In the illustrated example, the diameters D1 and D2 are approximately equal such that the threads on the threaded portion 38 do not extend radially outward relative to the axis N beyond the nozzle sleeve portion 40.

Similarly, a diameter D3 of the valve body sleeve portion 62 on the valve body 32 is approximately equal to an outer diameter D4 of the threaded portion 60 on the nozzle connection 58. In the illustrated example, the diameter D1 and D3 are approximately equal to each other such that the nozzle sleeve portion 40 and the valve body sleeve portion 62 form an interference fit or snap fit relative to each other. The approximately equal dimension of the diameters D1 and D3 reduces relative movement between the discharge nozzle 30 and the valve body 32 and increases the strength of the connection to prevent or reduce damage associated with impacts on the discharge nozzle 30. A distal end of the nozzle connection 58 is at least partially defined by a lip 64 on the valve body 32 that is in abutting or adjacent contact with the step 42 on the discharge nozzle 30.

In situations where there is a spacing between the nozzle sleeve portion 40 and the valve body sleeve portion 62, a projection 68 (FIG. 5) may be located on the nozzle sleeve portion 40. The projection 68 may serve several functions. For example, the projection 68 may be a symbol, such as an alpha and/or numeric character, that identifies the model of the discharge nozzle 30. The symbol may also identify the place of manufacture or a size of the discharge nozzle 30. Alternatively, the projection 68 may provide identification in the form of a geometric shape.

In addition to providing identification for the discharge nozzle 30, the projection 68 may provide additional contact with the valve body sleeve portion 62 to further secure the discharge nozzle 30 to the valve body 32. A dimension of the projection 68 from a surface of the nozzle sleeve portion 40 is sized to accommodate a spacing between the discharge nozzle 30 and the valve body 32. For example, adding a thickness of the projection 68 to the diameter D1 of the nozzle sleeve portion 40 would equal or exceed the diameter D3 of the valve body sleeve portion 62 on the nozzle connection 58. The projection 68 may extend between one and three thousandths of an inch (0.001-0.003 inches-0.0254 mm-0.0762 mm) from a surface of the nozzle sleeve portion 40. The projection 68 could also plastically deform as the discharge nozzle 30 is threaded into the nozzle connection 58 to further secure the discharge nozzle 30 relative to the valve body 32.

Furthermore, although only a single projection 68 is shown in the illustrated example, multiple projections 68 may be located on the nozzle sleeve portion 40. For example, three or more projections 68 could be evenly spaced around the diameter of the nozzle sleeve portion 40. Additionally, the projections 68 could have varying axial positions relative to the length of axis N to increase contact between the projection 68 and the valve body sleeve portion 62.

Figure 5:
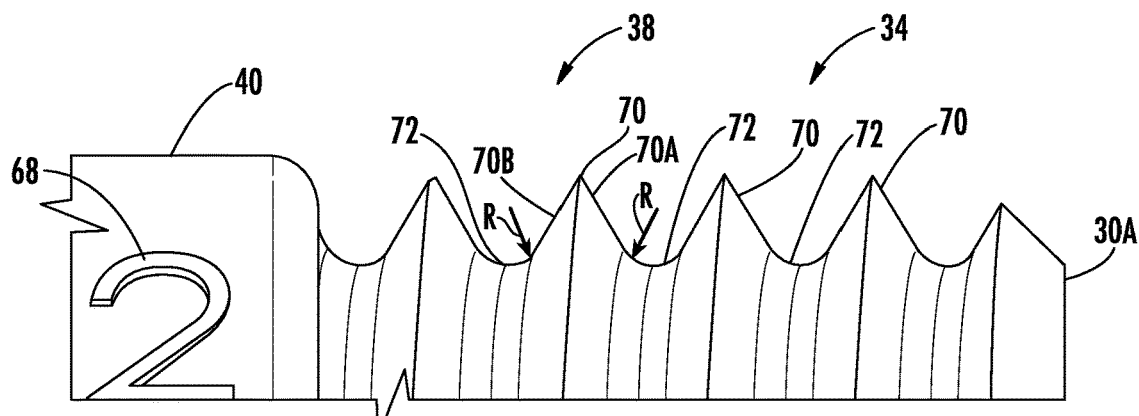
FIG. 5 illustrates an enlarged view of a portion of the discharge nozzle.

As shown in FIG. 5, the valve body connection 34 includes a thread 70 that circumscribes the valve body connection 34 and at least partially defines a root portion 72 located between adjacent rows of the thread 70 that also circumscribes the valve body connection 34. In the illustrated example, the root portion 72 includes a radius R extending between the adjacent rows of the thread 70.

Figure 6:
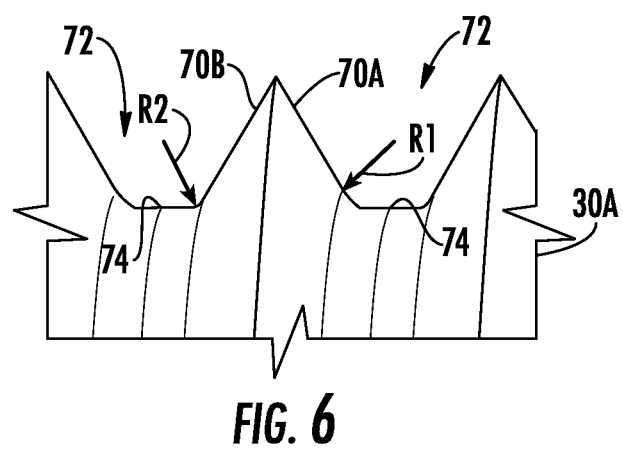
FIG. 6 illustrates an enlarged view of the discharge nozzle with another example threaded portion.

Alternatively, the root portion 72 could include a first radius R1 at an intersection of a proximally facing threaded surface 70A and a flat portion 74 of the root portion 72 and a second radius R2 at an intersection of a distally facing threaded surface 70B and the flat portion 74. See FIG. 6. The first radius R1 and the second radius R2 could also have a different dimension.

By having the root portion 72 with at least one radius instead of being flat between adjacent rows of the thread 70, stress concentrations that can result at the intersection of the thread 70 and the root portion 72 are reduced. This allows the discharge nozzle 30 to be able to withstand greater impact forces during low temperature impacts without failure occurring along one of the rows of threads 70.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A valve body and nozzle assembly for a fire extinguisher comprising:
    a valve body including a nozzle connection having a valve body threaded portion and a lip defining a distal edge of an outlet of the nozzle connection; and
    a non-metallic nozzle comprising a nozzle body extending along a central longitudinal axis from a proximal end to a distal end, the nozzle body including an internal passage that extends uninterrupted from an inlet at the proximal end to an outlet in an end face at the distal end, and with the proximal end having a valve body connection with a nozzle threaded portion in engagement with the valve body threaded portion and the nozzle threaded portion includes a root portion having at least one radius of curvature extending between adjacent rows of a thread of the nozzle threaded portion.

2. The assembly of claim 1, wherein the at least one radius of curvature includes a first radius at an intersection of a proximally facing threaded surface and the root portion and a second radius at an intersection of a distally facing threaded surface and the root portion.

3. The assembly of claim 2, wherein the root portion includes a flat portion between the first radius and the second radius and the first radius is different from the second radius.

4. The assembly of claim 1, wherein a valve body sleeve portion separates the valve body threaded portion from the outlet of the nozzle connection, the lip is located on an opposite side of the valve body sleeve portion from the valve body threaded portion relative to a longitudinal axis of the nozzle connection, and wherein the nozzle body includes a nozzle sleeve portion is immediately adjacent the nozzle threaded portion.

5. The assembly of claim 4, wherein the valve body sleeve portion includes an axial length greater than an axial length of one rotation of a thread on the valve body threaded portion and the valve body sleeve portion includes a radially inward facing surface relative to the longitudinal axis of the nozzle connection.

6. The assembly of claim 4, wherein valve body connection includes the nozzle sleeve portion distal of the nozzle threaded portion and the nozzle sleeve portion is located adjacent a step in the non-metallic nozzle and the step in the non-metallic nozzle directly abuts the lip.

7. The assembly of claim 6, wherein the nozzle sleeve portion includes an outer peripheral surface that extends circumferentially around the central longitudinal axis and is defined by a constant outer diameter, and wherein the nozzle sleeve portion includes at least one projection extending radially outward from the outer peripheral surface, and wherein the valve body is metallic and the non-metallic nozzle is made of a nylon material.

8. The assembly of claim 6, wherein the valve body sleeve portion includes an inner peripheral surface defined by a constant inner diameter surrounding the longitudinal axis of the nozzle connection, and wherein the inner peripheral surface directly contacts an outer peripheral surface of the nozzle sleeve portion to form an interference fit.

9. A valve body and nozzle assembly for a fire extinguisher comprising:
    a valve body including a nozzle connection having a valve body threaded portion and a valve body sleeve portion; and
    a non-metallic nozzle including a proximal end having a valve body connection with a nozzle threaded portion in engagement with the valve body threaded portion, a nozzle sleeve portion in engagement with the valve body sleeve portion in an interference fit, and the nozzle sleeve portion is immediately adjacent the nozzle threaded portion, and wherein the nozzle sleeve portion includes at least one projection extending radially outward from an outer peripheral surface of the nozzle sleeve portion and the at least one projection is plastically deformable in a radially inward direction as the nozzle threaded portion is threaded into the valve body threaded portion.

10. A valve body and nozzle assembly for a fire extinguisher comprising:
    a valve body including a nozzle connection having a valve body threaded portion and a valve body sleeve portion; and
    a non-metallic nozzle including a proximal end having a valve body connection with a nozzle threaded portion in engagement with the valve body threaded portion, a nozzle sleeve portion in engagement with the valve body sleeve portion in an interference fit, and the nozzle sleeve portion is immediately adjacent the nozzle threaded portion, and wherein the valve body sleeve portion separates the valve body threaded portion from an outlet of the nozzle connection and a distal edge of the outlet of the nozzle connection is defined by a lip, and wherein the lip is located on an opposite side of the valve body sleeve portion from the valve body threaded portion relative to a longitudinal axis of the nozzle connection, and wherein a nozzle body of the non-metallic nozzle includes a step that transitions from an outer peripheral surface of the nozzle sleeve portion to an outermost peripheral surface of the nozzle body at a distal end of the nozzle body that has an outer dimension that is greater than an outer dimension of the nozzle sleeve portion, and wherein the step is immediately adjacent to the lip.

11. A valve body and nozzle assembly for a fire extinguisher comprising:
    a valve body including a nozzle connection having a valve body threaded portion and a valve body sleeve portion; and
    a non-metallic nozzle including a proximal end having a valve body connection with a nozzle threaded portion in engagement with the valve body threaded portion, a nozzle sleeve portion in engagement with the valve body sleeve portion in an interference fit, and the nozzle sleeve portion is immediately adjacent the nozzle threaded portion, and wherein the valve body sleeve portion includes an axial length greater than an axial length of one rotation of threads on the valve body threaded portion and, and wherein the nozzle sleeve portion has a first dimension defined by an outer peripheral surface that surrounds a central longitudinal axis defined by the non-metallic nozzle and a radially outer dimension of the nozzle threaded portion defines a second dimension that is equal to the first dimension such that threads on the nozzle threaded portion do not extend radially outward relative to the central longitudinal axis beyond the nozzle sleeve portion.

12. The assembly of claim 11, wherein an inner peripheral surface of the valve body sleeve portion defines a third dimension that is approximately equal to an outer dimension of the valve body threaded portion on the nozzle connection which defines a fourth dimension, and wherein the third dimension of the valve body sleeve portion comprises a constant inner diameter and the nozzle sleeve portion comprises a constant outer diameter such that the nozzle sleeve portion and the valve body sleeve portion form an interference fit or snap fit relative to each other.

13. The assembly of claim 9, wherein the nozzle threaded portion includes a thread having a first radius at an intersection of a proximally facing threaded surface of the thread and a flat portion of a root portion and a second radius at an intersection of a distally facing threaded surface and a flat portion of another root portion.

14. A valve body and nozzle assembly for a fire extinguisher comprising:
a valve body including a nozzle connection having a valve body threaded portion and a valve body sleeve portion; and
a non-metallic nozzle including a proximal end having a valve body connection with a nozzle threaded portion in engagement with the valve body threaded portion, a nozzle sleeve portion in engagement with the valve body sleeve portion in an interference fit, and the nozzle sleeve portion is immediately adjacent the nozzle threaded portion, and wherein the nozzle threaded portion includes a thread having a first radius at an intersection of a proximally facing threaded surface of the thread and a flat portion of a root portion and a second radius at an intersection of a distally facing threaded surface and a flat portion of another root portion, and wherein the first radius is different from the second radius.

15. The assembly of claim 10, wherein the step in the non-metallic nozzle directly abuts the lip.

16. The assembly of claim 1, wherein the nozzle body includes a nozzle sleeve portion that is immediately adjacent the nozzle threaded portion, and wherein the nozzle sleeve portion includes an outer peripheral surface that extends circumferentially around the central longitudinal axis and is defined by a constant outer dimension, and the nozzle body including a step that is located adjacent an opposite edge of the nozzle sleeve portion from the nozzle threaded portion, and wherein the step transitions the nozzle body from the outer peripheral surface of the nozzle sleeve portion to an outermost peripheral surface of the nozzle body at the distal end that has an outer dimension that is greater than the constant outer dimension of the nozzle sleeve portion.

17. The assembly of claim 16, wherein the lip of the valve body is immediately adjacent the step of the nozzle body.

18. The assembly of claim 16, wherein the lip of the valve body directly abuts the step of the nozzle body.

19. The assembly of claim 16, wherein the constant outer dimension of the nozzle sleeve portion comprises a first dimension and wherein a radially outer dimension of the nozzle threaded portion defines a second dimension that is approximately equal to the first dimension such that threads on the nozzle threaded portion do not extend radially outward relative to the central longitudinal axis beyond the nozzle sleeve portion.

20. The assembly of claim 19, wherein an inner peripheral surface of a valve body sleeve portion defines a third dimension that is approximately equal to an outer dimension of the valve body threaded portion on the nozzle connection which defines a fourth dimension, and the first dimension and third dimension are approximately equal to each other such that the nozzle sleeve portion and the valve body sleeve portion form an interference fit or snap fit relative to each other.

21. The assembly of claim 20, wherein the outer peripheral surface of the nozzle sleeve portion includes at least one projection extending radially outward from the outer peripheral surface, and wherein the at least one projection is plastically deformable in a radially inward direction when the outer peripheral surface of the nozzle sleeve portion is fit into the inner peripheral surface of the valve body sleeve portion.

22. A valve body and nozzle assembly for a fire extinguisher comprising:
a valve body including a nozzle connection having a valve body threaded portion and a valve body sleeve portion; and
a non-metallic nozzle including a proximal end having a valve body connection with a nozzle threaded portion in engagement with the valve body threaded portion, a nozzle sleeve portion in engagement with the valve body sleeve portion in an interference fit, and the nozzle sleeve portion is immediately adjacent the nozzle threaded portion, and wherein the non-metallic nozzle comprises a nozzle body extending along a central longitudinal axis from a proximal end to a distal end, and wherein the nozzle body includes an internal passage that extends uninterrupted from an inlet at the proximal end to an outlet in an end face at the distal end.

* * * * *